J. B. RHODES.
DUMP CAR.
APPLICATION FILED APR. 30, 1918.
1,357,251.
Patented Nov. 2, 1920.
6 SHEETS—SHEET 5.
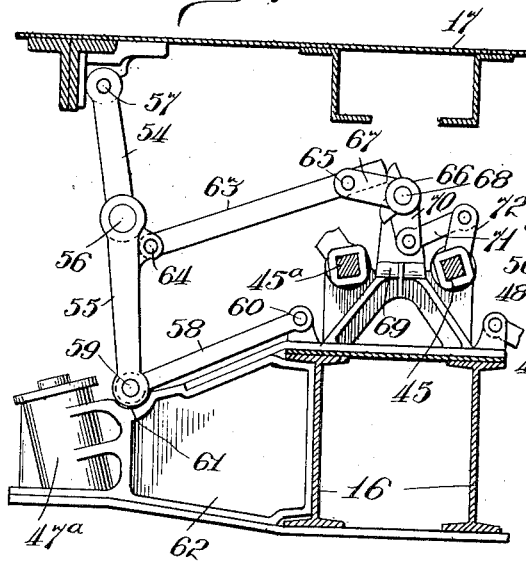
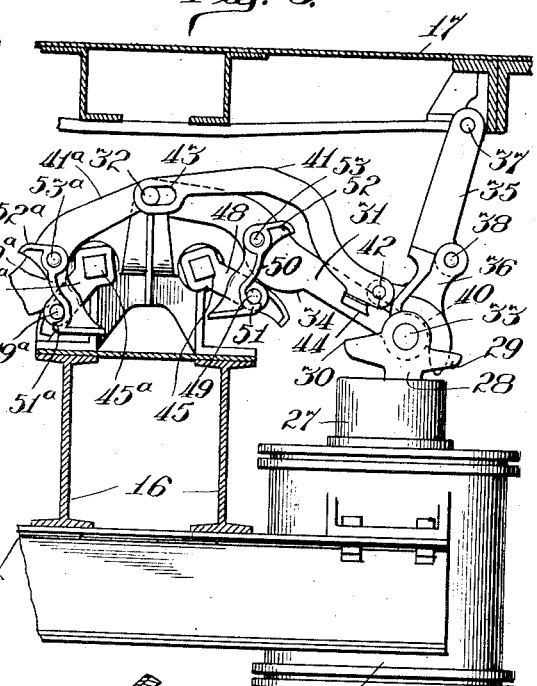
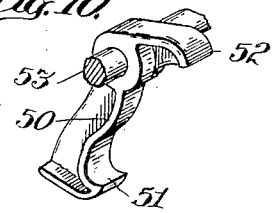
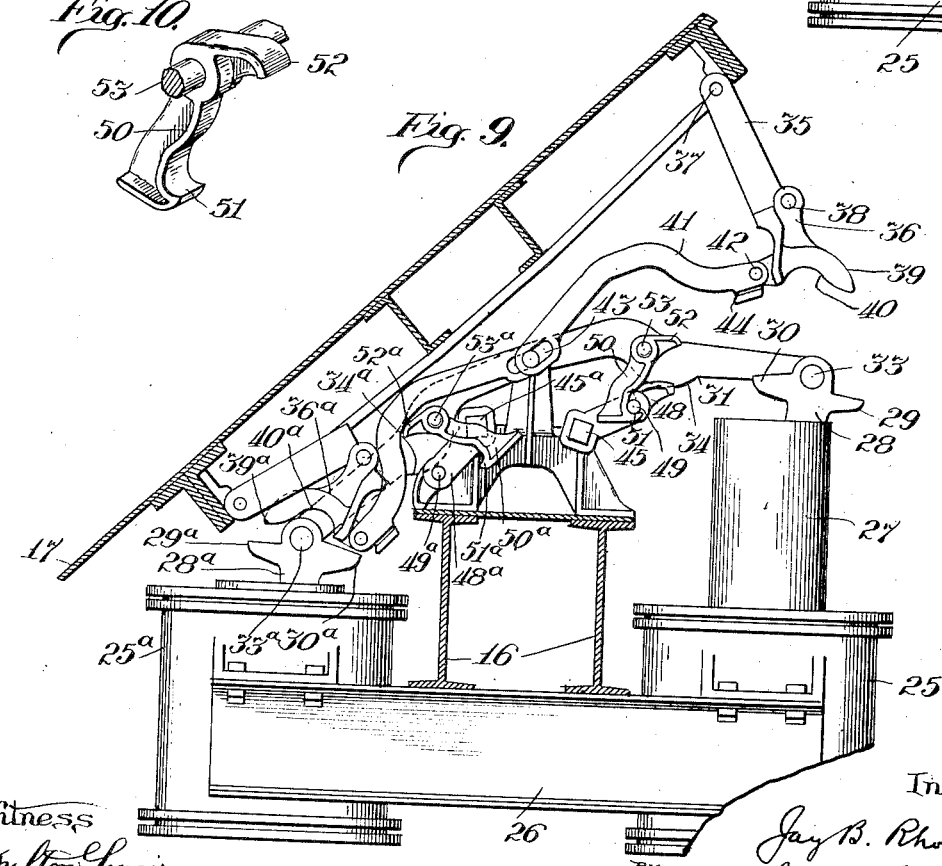
Inventor
Jay B. Rhodes.
Adams & Jackson
Attorneys
Witness
Milton Lenoir

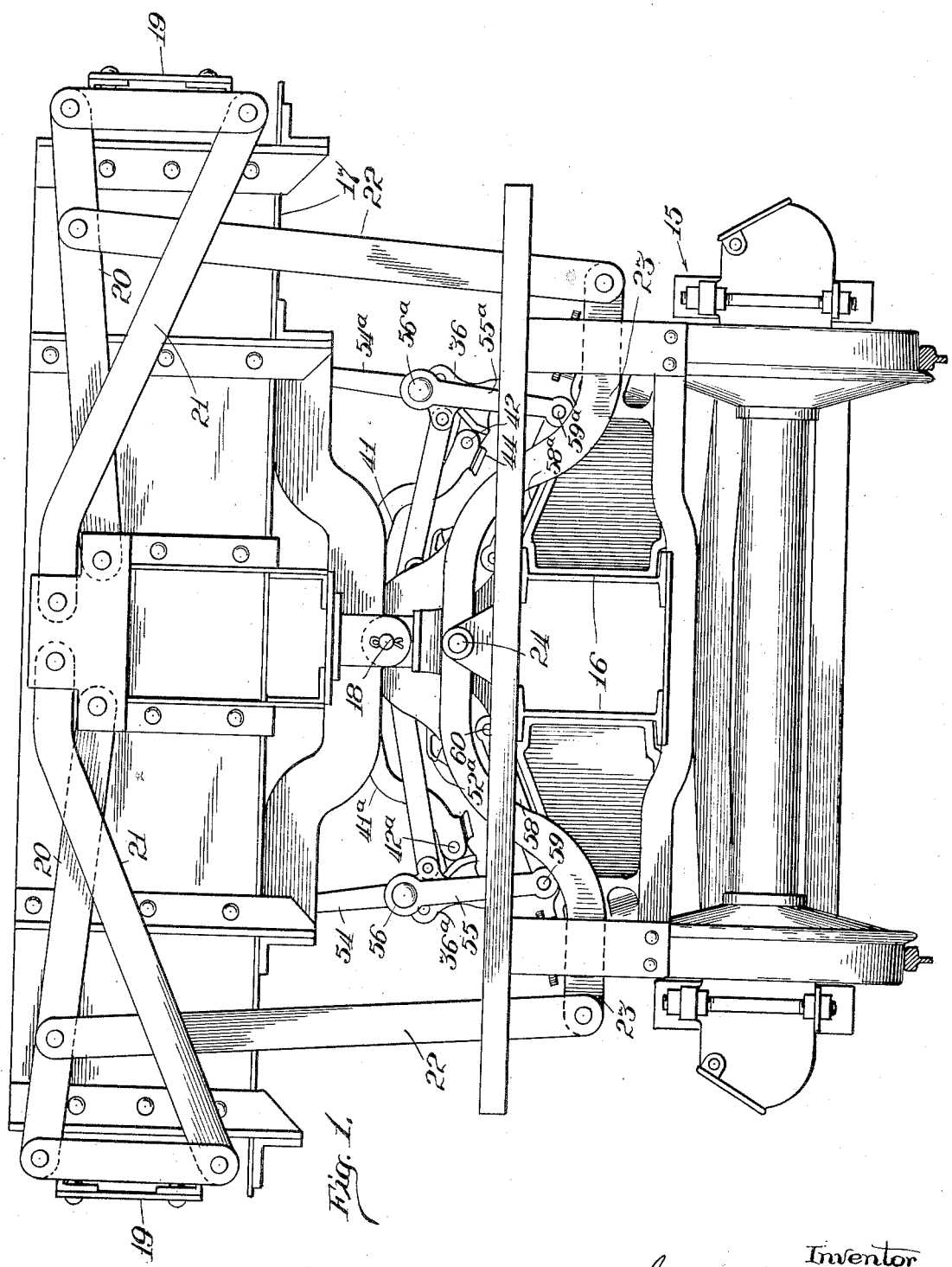

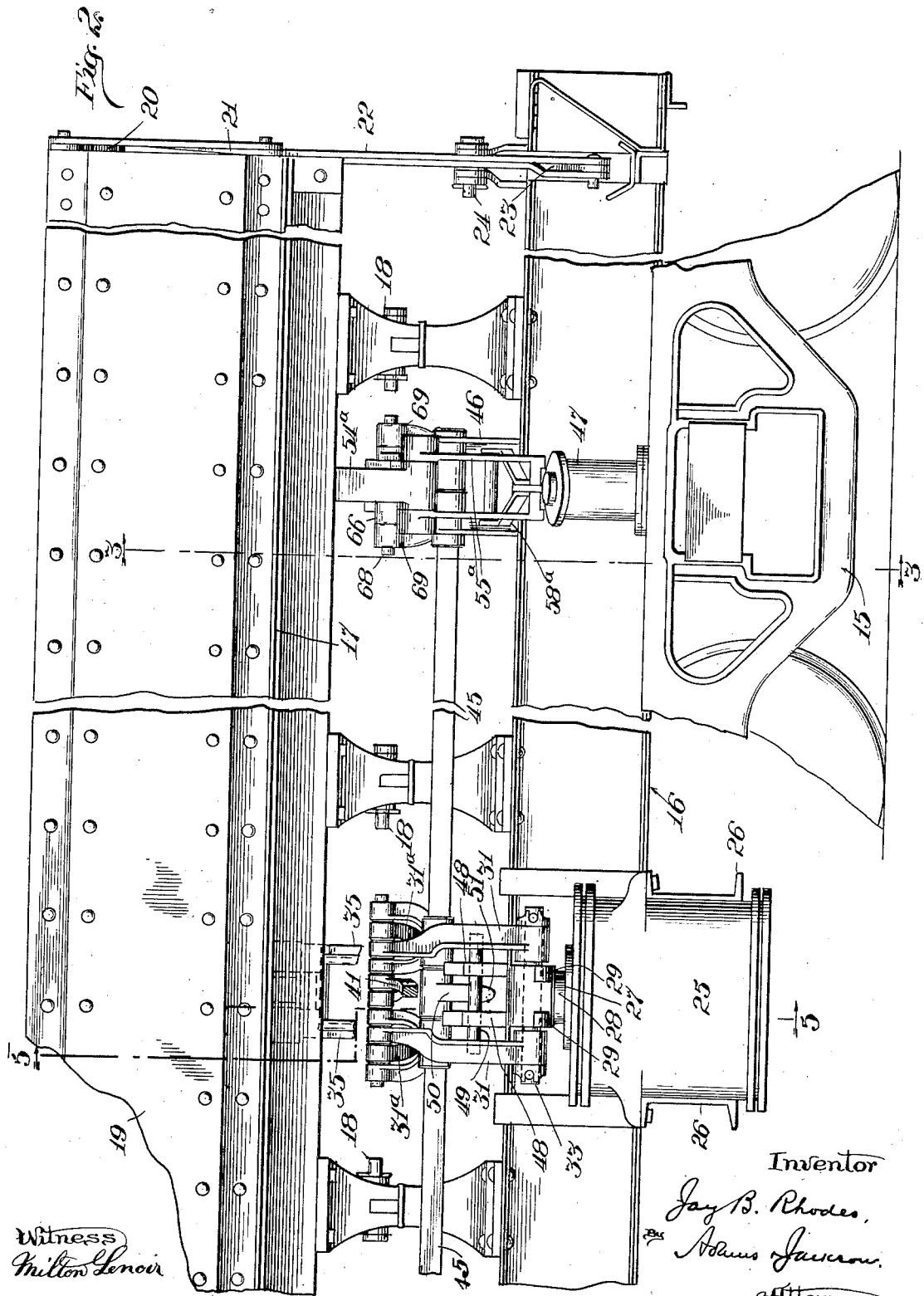

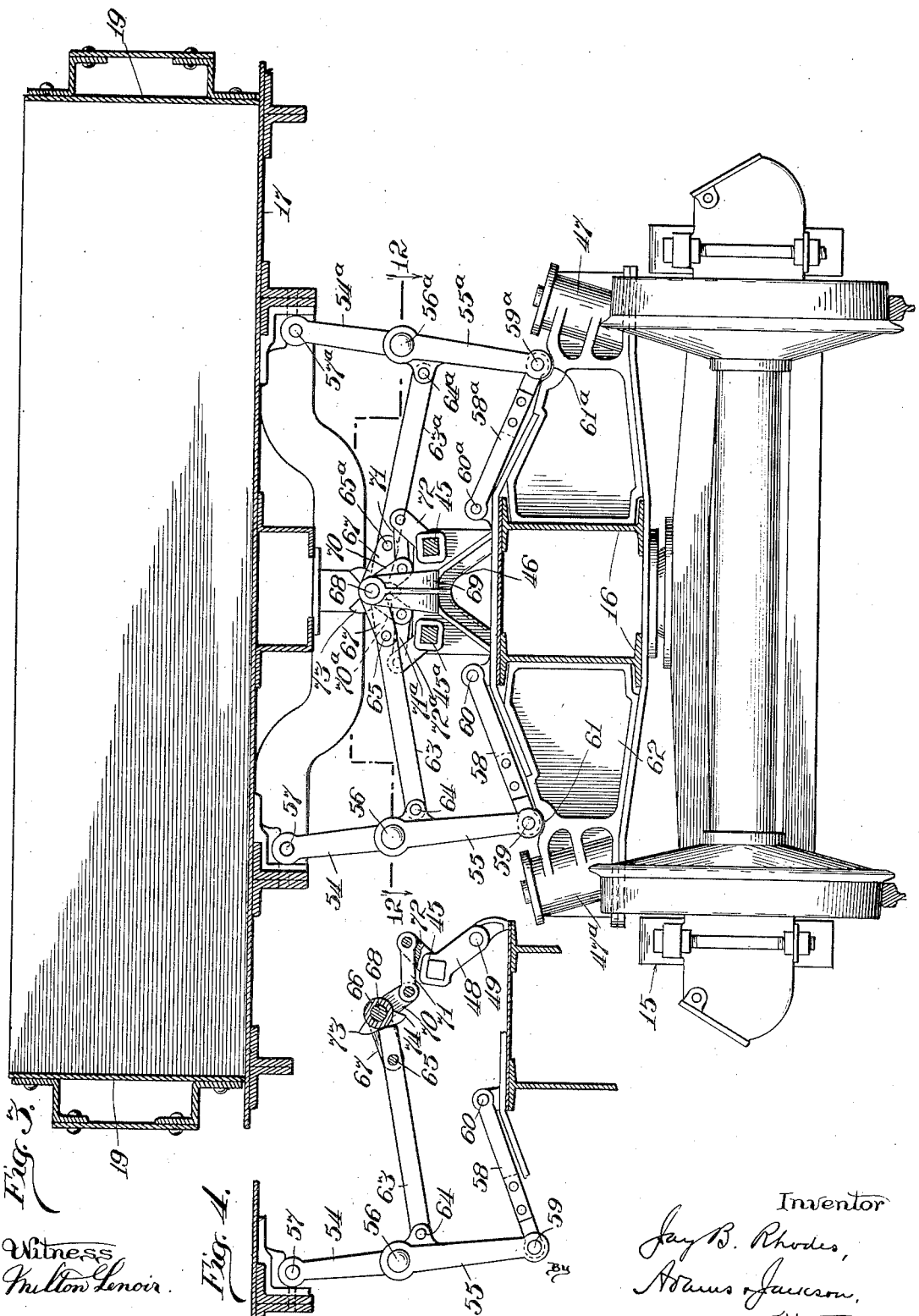

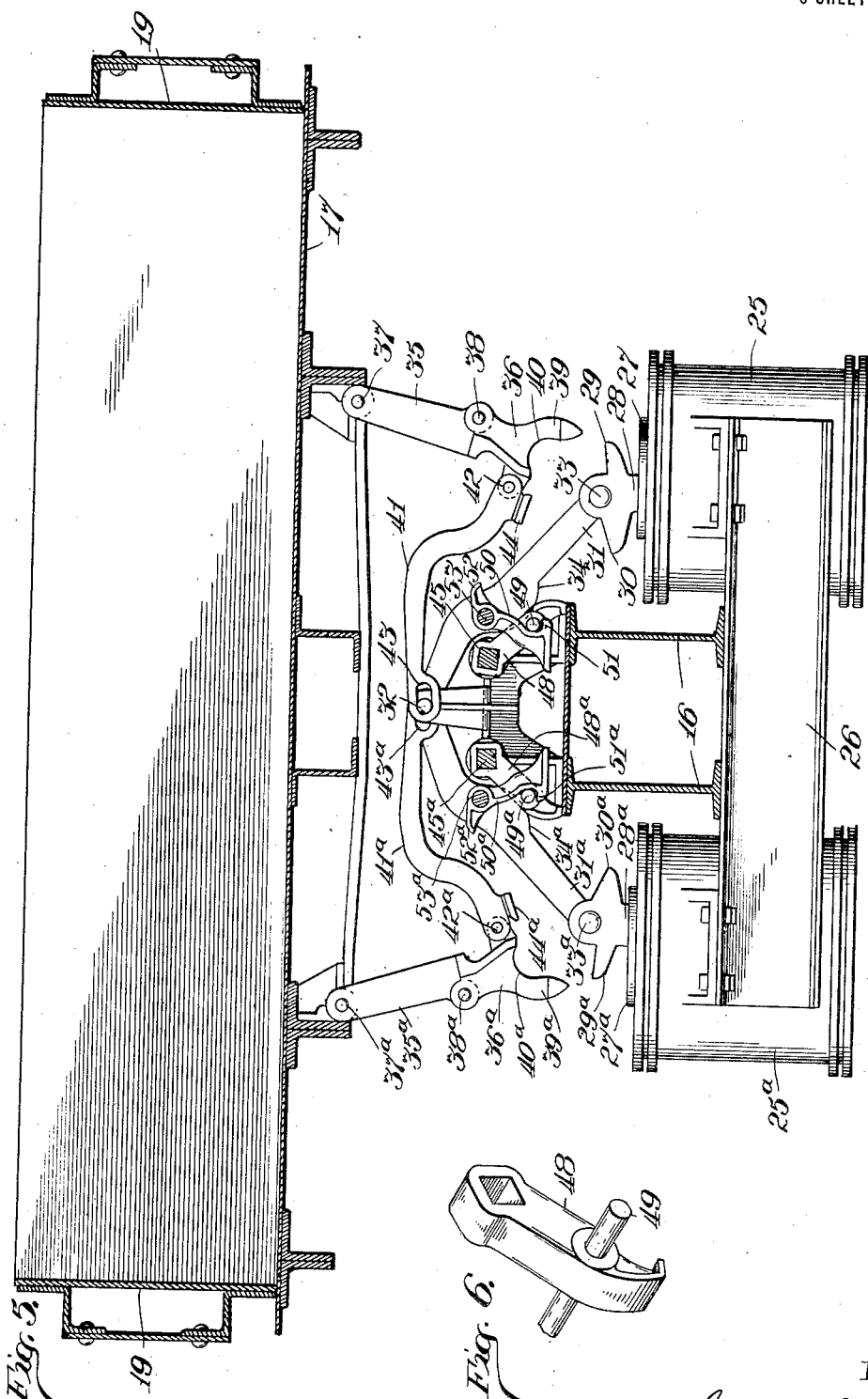

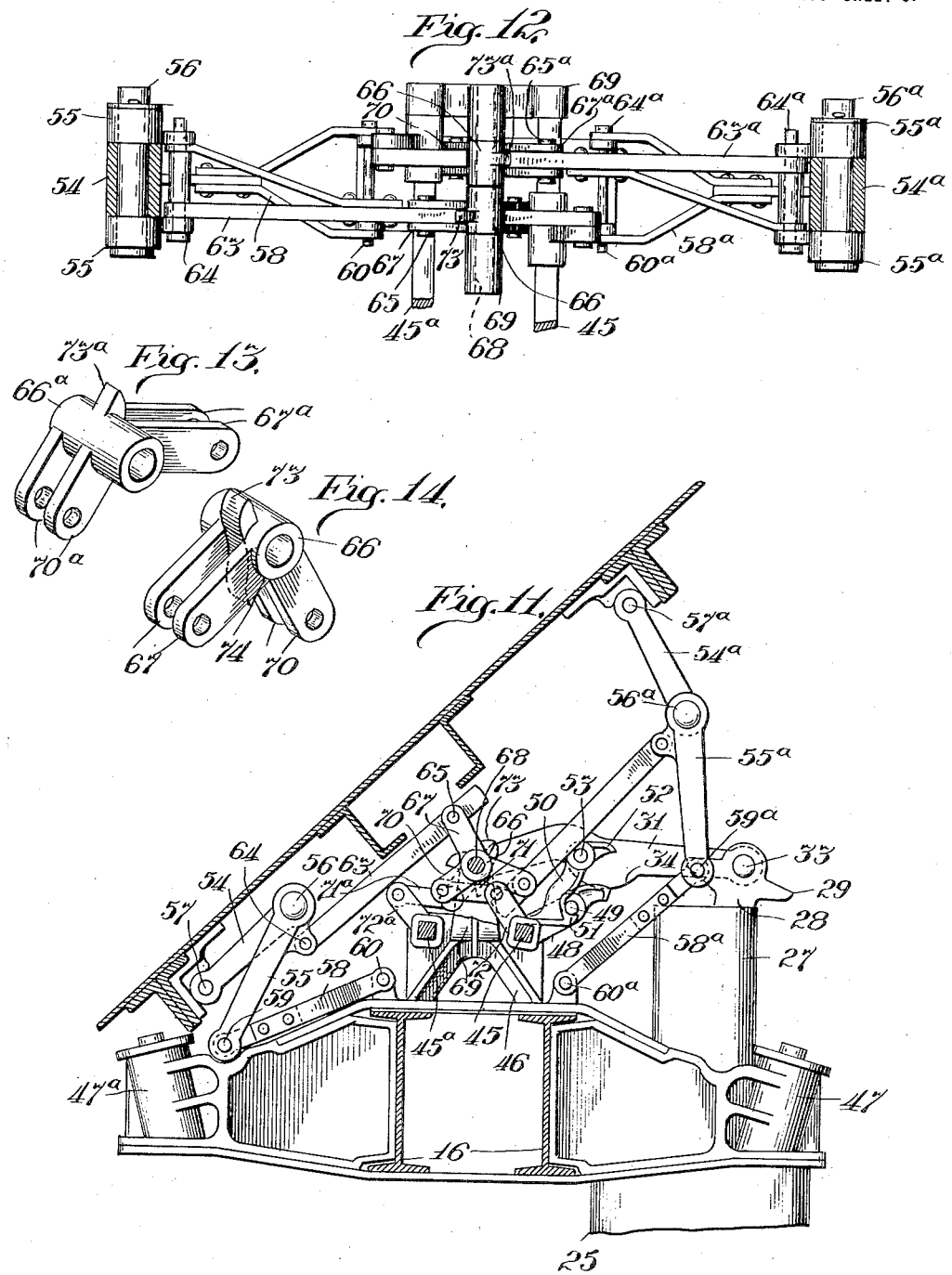

UNITED STATES PATENT OFFICE.

JAY B. RHODES, OF KALAMAZOO, MICHIGAN, ASSIGNOR TO WESTERN WHEELED SCRAPER COMPANY, OF AURORA, ILLINOIS, A CORPORATION OF ILLINOIS.

DUMP-CAR.

1,357,251.  Specification of Letters Patent.  Patented Nov. 2, 1920.

Application filed April 30, 1918. Serial No. 231,577.

*To all whom it may concern:*

Be it known that I, JAY B. RHODES, a citizen of the United States, and a resident of Kalamazoo, in the county of Kalamazoo and State of Michigan, have invented certain new and useful Improvements in Dump-Cars, of which the following is a specification, reference being had to the accompanying drawings.

My invention relates to dump cars of the general type shown and described in Letters Patent No. 1,256,163, granted February 12, 1918, in which the car bed is tilted in one direction or the other to discharge its load or to restore it to its normal position by means of compressed air operated pistons at opposite sides of the car. In such cars it is necessary to provide means for preventing the car bed from tilting accidentally out of its normal position, and it is of the utmost importance that the mechanism provided for such purpose be entirely reliable, so that it will not give way or become inoperative under the strains to which the car is subjected while in use, as any accidental tilting of the car bed is apt to be disastrous.

The object of my invention is to provide a dump car of the general type described, with automatically acting mechanism for normally holding the car bed securely in operative position so that all danger of accidental tilting thereof will be eliminated, and which will be so constructed and arranged as to permit the car bed to tilt to discharge its load when the appropriate mechanism is actuated for that purpose. I accomplish this object as illustrated in the accompanying drawings and as hereinafter described. What I regard as new is set forth in the claims.

In the accompanying drawings—

Figure 1 is an end elevation of my improved car;

Fig. 2 is a partial side elevation thereof, partly broken away;

Fig. 3 is a transverse section on line 3—3 of Fig. 2, some parts being in elevation;

Fig. 4 is a view diagrammatic in character, illustrating the action of the locking mechanism;

Fig. 5 is a view, partly in section on line 5—5 of Fig. 2;

Fig. 6 is a perspective view illustrating one of the locking arms;

Fig. 7 is a partial cross section showing some of the parts illustrated in Fig. 3 in a changed position;

Fig. 8 is a cross sectional view showing some of the parts shown in Fig. 5 in a position corresponding to that of the parts shown in Fig. 7;

Fig. 9 is a cross sectional view illustrating the parts shown in Fig. 5 in the positions they assume when the car bed has been dumped;

Fig. 10 is a perspective view illustrating one of the latches which forms a part of the mechanism for releasing the locking mechanism to permit the car bed to be tilted;

Fig. 11 is a view showing the parts shown in Fig. 3 in the positions they assume when the car bed has been dumped;

Fig. 12 is a horizontal section on line 12—12 of Fig. 3; and

Figs. 13 and 14 are perspective views showing opposite sides of one of the members of the locking mechanism.

The car bed illustrated in the drawings comprises the usual under-body, on which the car bed is arranged to rock to discharge its load at either side, and any suitable construction may be employed for this purpose. In the car illustrated, 15 indicates one of the trucks and 16 the under-body, which, as best shown in Fig. 1, preferably comprises longitudinally extending I beams suitably mounted on the trucks. 17 indicates the car bed which is mounted upon pivots 18 disposed centrally under the bed, as illustrated in Figs. 1 and 2. 19 indicates the usual side gates connected with the ends of the bed 17 by straps 20—21, and arranged to be held up to permit the contents of the bed to be discharged when it is tilted by thrust bars 22, connected at their upper ends with the straps 20, and at their lower ends with swinging bars 23, pivoted at 24 to the under-body of the car. This arrangement permits the side gate at that side of the bed which is raised in dumping it, to rise with it, while the gate at the opposite side is held up in substantially its normal position while that side of the bed swings down away from it. This construction is old and forms no part in my present invention. 25—25ᵃ indicate cylinders at opposite sides of the car and suitably secured to the under-body, as by cross beams 26 connected with the I-beams 16, as shown in Fig. 5. These cylinders are located substantially at the longitudinal center of the car, and are arranged to be supplied with compressed air in the usual way, either for dumping or righting purposes. The mechanism provided at the opposite sides of the car for dumping and righting the bed and for locking the bed in operative position and unlocking it, is the same, and therefore it will suffice to describe specifically one set of such mechanism, as it will be understood that such description applies also to the other set. For convenience, however, the corresponding parts of the two sets of mechanism will be distinguished by the exponent "a" applied to the reference numbers.

27 indicates a cylindrical plunger mounted in the cylinder 25, said plunger being closed at its lower end and having mounted therein a rocking plunger rod 28, which swings transversely of the car. Adjacent to its upper end the plunger rod 28 is provided with fingers 29—30, the purpose of which will be hereinatfer set forth. 31 indicates swinging arms, the inner ends of which are pivoted along the center line of the car, as shown at 32 in Fig. 5, their outer ends being pivoted to the upper end of the plunger rod 28, as shown, by means of a rod 33, best shown in Fig. 2. The arms 31 are provided intermediately on their lower edges with a projection or bulge 34, the purpose of which will be explained later.

35—36 indicate the members of a folding thrust bar or toggle, which is adapted to coöperate with the plunger rod 28 in dumping the bed. The upper member 35 of said toggle is pivoted at 37 to the under portion of the car bed so that it swings transversely thereof, and the lower member 36 of the toggle is connected to the member 35 by a pivot 38, located at one side of the line of thrust, so that the upper end of member 36 bears against the member 35 at one side of the pivot 38, forming a knuckle joint which may break inwardly under proper conditions, but not outwardly. 39 indicates a finger which projects downwardly and outwardly from the lower end of the member 36, and is adapted to be engaged by the finger 29 of the plunger rod 28. 40 indicates a socket in the lower end of the member 36 which is adapted to receive the upper end of the plunger rod 28, the latter being rounded to fit said socket. 41 indicates a link pivotally connected at its outer end with the lower portion of the member 36, as shown at 42 in Fig. 5 and loosely mounted at its inner end on the pivot 32. In order to allow some lost motion the inner end of the link 41 is slotted, as shown at 43 to receive said pivot. The length of the link 41 is such as to hold the thrust bar composed of the members 35—36, normally in the position shown in Fig. 5, to wit, in an inclined position with its lower end nearer the center of the car. The arrangement of the parts thus far described is such that when the plunger rod 28 is projected by the admission of compressed air to the cylinder 25, its upper end is caused to swing outward by the arm 31 into the socket 40. As the plunger rod continues to rise, power is applied to the car bed at one side of the center thereof through the members 35—36 of the thrust bar, and as the line of thrust lies inside of the pivot 38, the toggle will remain unbroken and the car bed will be tilted to discharge its load at the opposite side. In order, however, to permit the opposite side of the bed to descend beyond a certain point, it is necessary to break the toggle at that side, or, in other words, to cause the members of the toggle to fold. This is accomplished by means of the finger 39ª, which engages the finger 29ª of thrust bar 28ª, and thereby causes the member 36ª to turn about its pivot 38ª in a clockwise direction as viewed in Fig. 5, thus breaking the toggle and causing the members 35ª—36ª to fold together in the manner illustrated at the left in Fig. 9, thus permitting that side of the bed to descend. In order to insure against the danger of breaking the toggle when the thrust bar is projected to operate the bed, the arm 41 is provided with a block or plate 44, adjacent to the pivot 42, which block is adapted to be engaged by the finger 30 of the plunger rod, thereby applying upward thrust to the inner margin of the member 36, which tends to rotate it about the pivot 38 in a clockwise direction as viewed in Fig. 5, thereby preventing the toggle from breaking.

When the bed has been tilted it is restored to its normal position by projecting the plunger rod at the dumping side of the bed against the folded members of the thrust bar as illustrated at the left in Fig. 9. When the bed reaches its horizontal position and the righting plunger has been retracted, the folded toggle automatically returns to its operative position shown in Fig. 5.

All the mechanism thus far described is old except the provision of the projection or bulge 34, and nearly all the parts described are shown and described in my said patent. It has, however, been deemed advisable to describe them here in order that the relation of the locking mechanism to the other parts of the mechanism and the manner in which it operates may be clearly understood.

45 indicates a rock shaft which extends longitudinally of the car at one side and adjacent to the center thereof, as shown in Fig. 3. Preferably two of such shafts are provided at each side of the car mounted on brackets 46 in alinement with each other and extending from approximately the longitudinal center of the car to near the end portions thereof, the outer ends of said shafts terminating over the centers of the trucks 15, as shown in Fig. 2. The trucks are preferably provided with bumpers 47 of any suitable description, to limit the extent to which the car bed may be tilted, as shown in Fig. 3. At their inner or adjoining ends, the shafts 45 are provided with rigid locking arms 48, which are adapted normally to bear upon the under-body 16, as shown at the right in Fig. 5, thereby preventing such shafts from rocking in a clockwise direction as viewed in said figure. Said shafts may, however, rock in the opposite direction. 49 indicates a rod which is mounted in the locking arms 48 of the two adjoining shafts 45 near their outer ends, as shown in Figs. 2, 6, and 9. 50 indicates a latch which is pivotally mounted intermediately on the arms 31 and is provided at its lower end with a hook 51 adapted to engage the rod 49. At its upper end, said latch is provided with a lug 52, the purpose of which will be hereinafter explained. 53 indicates the pivot of the latch 50, which, as shown in Figs. 9 and 10, is located near the upper end of said latch so that the hook 51 hangs pendent by gravity. The arrangement of these parts is such that when the locking arm 48 is in its operative position, shown in Fig. 5, and the plunger rod 28 is in its retracted position, the hook 51 will be in engagement with the rod 49, and consequently when said plunger rod is projected, the upward swing of the arms 31 will raise the latch 50 and rock the shafts 45 in a counter-clockwise direction as viewed in Fig. 5.

54—55 indicate the upper and lower members of a folding strut, the adjoining ends of which are connected together by a pivot 56. The upper member 54 is pivoted to one side of the car bed by a pivot 57, and the lower member 55 is connected with the under-body of the car by a swinging link 58, connected to said member by a pivot 59, the inner end of said link being mounted on a pivot 60 near the center of the car, as shown in Fig. 3. The arrangement is such that when the members of the strut are in substantial alinement, as shown in said figure, which is their operative position, the lower end of the member 55 rests in a socket 61 provided in the under-body, preferably in a bolster 62, shown in Fig. 3, and said strut is outwardly inclined toward its upper end. Thus the struts at the opposite sides of the car hold the bed in its horizontal position as long as the members of each strut maintain their alined position shown in Fig. 3. If, however, the struts at one side of the car be permitted to fold, that side of the car bed may be tilted downward, as shown in Fig. 11, the adjoining ends of the members 54—55 swinging inwardly until finally they assume the position shown at the left in said figure. At the same time upward movement of the opposite side of the bed is permitted, because the link 58ª may swing upward about its pivot so that the strut at that side rises with the side of the bed to which it is attached.

The members 54—55 of the strut are normally held in operative position by a locking bar 63, which extends transversely of the car, as shown in Fig. 3, its outer end being connected with the strut near the pivot 56 thereof by a pivot 64, while its inner end is connected by a pivot 65 with a rocking lever 66 by means of arms 67, which form a part of said lever. I prefer to provide two of such arms arranged in the form of a fork with the inner end of the locking bar 63 fitting between them, as by this means a better working connection between the parts is obtained. The central portion of the lever 66 is in the form of a sleeve or hub, as shown in Fig. 14, which fits upon a pivot 68 mounted in standards 69 carried by the bracket 46, as shown in Fig. 3, so that the arms 67 swing transversely of the car. The pivot 68 is best mounted in alinement with the pivots which support the car bed, as shown by Figs. 2 and 3. 70 indicates arms carried by the lever 66, which extend from the hub thereof at an angle with the arms 67, as shown in Fig. 14. The arms 70 are connected by a link 71 with an arm 72, carried by the rock shaft 45, which, as shown in Fig. 4, also carries the locking arm 48. 73 indicates an upwardly projecting lug carried by the hub of the lever 66 between the arms 67, and 74 indicates a similar downwardly projecting lug carried by said lever. These lugs merge into each other opposite the inner end of the bar 63, and, as shown in Fig. 4, when the several parts are in their normal position, the lugs 73—74 extend slightly outward beyond the inner end of said bar. At such time the members 54—55 will be substantially in alinement with each other, the locking arm 48 will be in engagement with the under-body, and the pivot 65 of the locking bar 63 will be slightly below a line intersecting pivots 64—68. Thus the members 54—55 will be locked in alinement with each other, as any thrust along the line of the locking arm 63 will be directed below the pivot 68 and will therefore tend to rock lever 66 in a counter-clockwise direction as viewed in Fig. 4, and consequently to rotate rock shaft 45 in a clockwise direction as viewed in said figure, but such movement of said rock shaft will be prevented by the engagement of the lower end of locking arm 48 with the under-body of the car. Thus a positive lock is provided which prevents folding of the members 54—55 of the strut. As a further measure of safety, I provide for holding the locking arm 48 down in the position shown in Fig. 4 when the plunger rods are in operative position, this being effected by means of the swinging arms 31, which are arranged to bear down upon the rod 49 at that time, as shown in Fig. 5. The bulge 34 is provided for this purpose, but it will be understood that the same thing could be accomplished without providing a distinct bulge, as my invention in this respect contemplates the provision of any suitable means for holding the locking arm 48 down in operative position when the plunger rod controlling the movement of such arm is not operating.

It will be apparent from an inspection of Figs. 4 and 5 that when the right hand plunger rod 28 is projected to dump the car to the left, the arm 31 connected therewith will be swung upward, thereby lifting the latch 50 carried thereby. Said latch being in engagement with the rod 49 carried by locking arm 48, said arm will be lifted, rocking shaft 45 in a counter-clockwise direction as viewed in Fig. 5. This will rock lever 66 in a clockwise direction as viewed in Fig. 4, thereby raising the inner end of locking bar 63. The upward movement of the inner end of said locking bar will be assisted by lug 74, which will swing under the inner end of said bar and raise it. The swinging movement of the arm 67 will move the locking arm 63 inwardly, thereby breaking the toggle formed by the members 54—55, and permitting the strut to fold, and as this movement continues the parts will ultimately assume the position shown in Fig. 11, at which time the car bed will be completely tilted. When this occurs, the strut at the right hand side of the car, as viewed in Fig. 11, will be carried up by the tilting of the car bed until it assumes the position shown in said figure. The latch 50, carried by the arm 31, will remain in engagement with the rod 49, and when the arm 31 swings downward by the retraction of the plunger rod 28, the rock shaft 45 will be rocked in the opposite direction, thereby moving the locking bar 63 outward and again bringing the members 54—55 into alinement with each other. This operation is promoted by the engagement of the lug 73 with the inner end of the bar 63, as illustrated in Fig. 7. When the bed is tilted to the left, as shown in Fig. 9, the intermediate portion of the link 41ª will strike the lug 52ª, thereby rocking the latch 50ª in a counter-clockwise direction as viewed in Fig. 9, and disengaging the hook 51ª from the rod 49ª, as shown in said figure. The purpose of this is to prevent the strut at the right hand side of the car from being unlocked when the left hand cylinder is operated to restore the car bed to its normal position. Obviously by disengaging the hook 51ª from the rod 49ª, as described, when the plunger rod 28ª is projected to restore the bed to its horizontal position, the locking arm 48ª will not be moved, but will remain in its operative position, and consequently the locking bar 63ª will remain operative to hold the members 54ª—55ª of the right hand strut in alinement with each other, and thereby prevent the car bed from going beyond its horizontal position when being righted.

While I have described with considerable particularity the embodiment of my invention illustrated in the drawings, I wish it to be understood that my invention is not limited to the specific construction shown and described except in so far as such construction is specifically claimed, but includes generically the subject-matter of the broader claims.

What I claim as my invention, and desire to secure by Letters Patent, is:

1. A dump car comprising a car bed adapted to be tilted, a suitable support therefor, a laterally movable strut for preventing tilting of the bed, a bar connected with said strut for moving the same, a rocking lever connected with said bar, means co-acting with said lever to hold said strut in operative position, and means for actuating the latter means to permit tilting of the bed.

2. A dump car comprising a car bed adapted to be tilted, a suitable support therefor, a strut pivotally connected with the car bed and operating to prevent tilting thereof, a bar connected with said strut for moving the same into and out of operative position, a rocking lever connected with said bar, means co-acting with said lever to hold said strut in operative position, and means for actuating the latter means to permit tilting of the bed.

3. A dump car comprising a car bed adapted to be tilted, a suitable support therefor, a laterally movable strut for preventing tilting of the bed, said strut being pivotally connected with the bed, a bar connected with said strut for moving the same into and out of operative position, a rocking lever connected with said bar, means co-acting with said lever to hold said strut in operative position, and means for actuating the latter means to permit tilting of the bed.

4. A dump car comprising a car bed adapted to be tilted, a suitable support therefor, a laterally movable strut for preventing tilting of the bed, said strut being composed of members hinged together, a bar connected with said strut for moving the same into and out of operative position, a rocking lever connected with said bar, means co-acting with said lever to hold said strut in operative position, and means for actuating the latter means to permit tilting of the bed.

5. A dump car comprising a car bed adapted to be tilted, a suitable support therefor, a laterally movable strut for preventing tilting of the bed, said strut being composed of members hinged together, a bar connected with said strut adjacent to the hinge thereof for moving the same into and out of operative position, a rocking lever connected with said bar, means co-acting with said lever to hold said strut in operative position, and means for actuating the latter means to permit tilting of the bed.

6. A dump car comprising a car bed adapted to be tilted, a suitable support therefor, a folding strut for preventing tilting of the bed, a bar connected with said strut, a rocking lever connected with said bar and operating to move said strut into and out of operative position, a locking arm pivotally mounted on said support and connected with said lever, said arm serving as a stop to limit the movement of said lever in one direction, and means for actuating said arm to permit tilting of the bed.

7. A dump car comprising a car bed adapted to be tilted, a suitable support therefor, a folding strut for preventing tilting of the bed, a bar connected with said strut, a rocking lever connected with said bar and operating to move said strut into and out of operative position, a locking arm pivotally mounted on said support and connected with said lever, said arm serving as a stop to limit the movement of said lever in one direction, and power operated means for actuating said arm to permit tilting of the bed.

8. A dump car comprising a car bed adapted to be tilted, a suitable support therefor, a folding strut for preventing tilting of the bed, a bar connected with said strut, a rocking lever connected with said bar and operating to move said strut into and out of operative position, a locking arm pivotally mounted on said support and connected with said lever, said arm serving as a stop to limit the movement of said lever in one direction, means for normally holding said arm in operative position, and power operated means for actuating said arm to permit tilting of the bed.

9. A dump car comprising a car bed adapted to be tilted, a suitable support therefor, a movable strut for preventing tilting of the bed, a bar connected with said strut, a rocking lever connected with said bar and operating to move said strut into and out of operative position, power operated mechanism for tilting the car bed, and mechanism for locking said lever against movement in either direction when said power operated mechanism is not in operation.

10. A dump car comprising a car bed adapted to be tilted, a suitable support therefor, a movable strut for preventing tilting of the bed, a bar connected with said strut, a rocking lever connected with said bar and operating to move said strut into and out of operative position, means for limiting the movement of said lever in one direction, power operated means for tilting the bed, and means for holding said lever against movement in the opposite direction when said power operated mechanism is not in operation.

11. A dump car comprising a car bed adapted to be tilted, a suitable support therefor, a movable strut for preventing tilting of the bed, a bar connected with said strut, a rocking member coöperating with said bar to control the position of said strut, means for limiting the movement of said rocking member in one direction, power operated mechanism for tilting the car bed, and means for holding said rocking member against movement in the opposite direction when said power operated mechanism is not in operation.

12. A dump car comprising a car bed adapted to be tilted, a suitable support therefor, a strut for preventing tilting of the bed, said strut being composed of members hinged together, a bar connected with said strut, a rocking member coöperating with said bar to control the position of said strut, power operated mechanism for tilting the car bed, and means for locking said rocking member against movement in either direction when said power operated mechanism is not in operation.

13. A dump car comprising a car bed adapted to be tilted, a suitable support therefor, a strut for preventing tilting of the bed, said strut being composed of members hinged together, a bar connected with said strut adjacent to said hinge, a rocking member coöperating with said bar to control the position of said strut, power operated mechanism for tilting the car bed and means for locking said rocking member against movement in either direction when said power operated mechanism is not in operation.

14. A dump car comprising a car bed adapted to be tilted, a suitable support therefor, a toggle for preventing tilting of the bed, a bar connected with said toggle for holding the same in operative position, devices coöperating with said bar to normally hold it against movement in either direction, and power operated means for actuating said devices to release said bar and permit the bed to be tilted.

15. A dump car comprising a car bed adapted to be tilted, a suitable support therefor, a strut for preventing tilting of the bed, a bar connected with said strut, a rocking lever having an arm connected with said bar, a rock shaft extending longitudinally of the car, a locking arm carried by said rock shaft and adapted to bear upon the under body to limit rocking of said shaft in one direction, an arm carried by said rock shaft, and a link connecting said arm with said rocking lever.

16. A dump car comprising a car bed adapted to be tilted, a suitable support therefor, a strut for preventing tilting of the bed, a bar connected with said strut, a rocking lever having an arm connected with said bar, lugs carried by said rocking lever and adapted to project at opposite sides of said bar when the latter is in operative position, and means for limiting the movement of said rocking lever in one direction.

17. A dump car comprising a car bed adapted to be tilted, a suitable support therefor, a strut for preventing tilting of the bed, a bar connected with said strut, a rocking lever having an arm connected with said bar, lugs carried by said rocking lever and adapted to project at opposite sides of said bar when the latter is in operative position, and an arm connected with said rocking lever and adapted to engage the under body of the car to limit the movement of said rock shaft in one direction.

18. A dump car comprising a car bed adapted to be tilted, a suitable support therefor, a strut for preventing tilting of the bed, a bar connected with said strut, a rocking lever having an arm connected with said bar, a rock shaft extending longitudinally of the car, a locking arm carried by said rock shaft and adapted to bear upon the under body to limit rocking of said shaft in one direction, an arm carried by said rock shaft, a link connecting the latter arm with said rocking lever, and lugs carried by said rocking lever and adapted to project at opposite sides of said bar when the latter is in operative position.

19. A dump car comprising a car bed adapted to be tilted, a suitable support therefor, a laterally movable strut for preventing tilting of the bed, said strut being composed of members hinged together, a link connected with the lower member of said strut and with the car bed, a bar connected with the intermediate portion of said strut for moving the same, a rocking lever connected with said bar, means connected with said lever and operating to limit the movement thereof in one direction, and means for actuating said rocking lever to release said strut and permit folding thereof.

20. A dump car comprising a car bed adapted to be tilted, a suitable support therefor, a laterally movable strut for preventing tilting of the bed, said strut being composed of members hinged together, a link connected with the lower member of said strut and with the car bed, a bar connected with the intermediate portion of said strut for moving the same, a rocking lever connected with said bar, a locking arm connected with said lever and adapted to engage the under body of the car to limit the movement of said lever in one direction, and means for actuating said rocking lever to release said strut and permit folding thereof.

21. A dump car comprising a car bed adapted to be tilted, a suitable support therefor, a strut for preventing tilting of the bed, said strut being composed of members hinged together, a bar connected with said strut, a rocking lever having an arm connected with said bar, a rock shaft extending longitudinally of the car, a locking arm carried by said rock shaft and adapted to bear upon the under body to limit rocking of said shaft in one direction, an arm carried by said rock shaft, a link connecting the latter arm with said rocking lever, and a link connecting the lower end portion of said strut with the under body of the car.

22. A dump car comprising a car bed adapted to be tilted, a suitable support therefor, a strut for preventing tilting of the bed, said strut being composed of members hinged together, the upper strut member being pivotally connected with the car bed, a link connecting the lower strut member with the under body of the car, a bar connected with said strut intermediately thereof, a rocking member coöperating with said bar to control the position of said strut, and means adapted to be operated to rock said rocking member and release said strut to permit tilting of the car bed.

JAY B. RHODES.